APERIODIC PULSE CODE MODULATOR OR ANALOG TO DIGITAL CONVERTER
Filed March 4, 1963 3 Sheets-Sheet 1
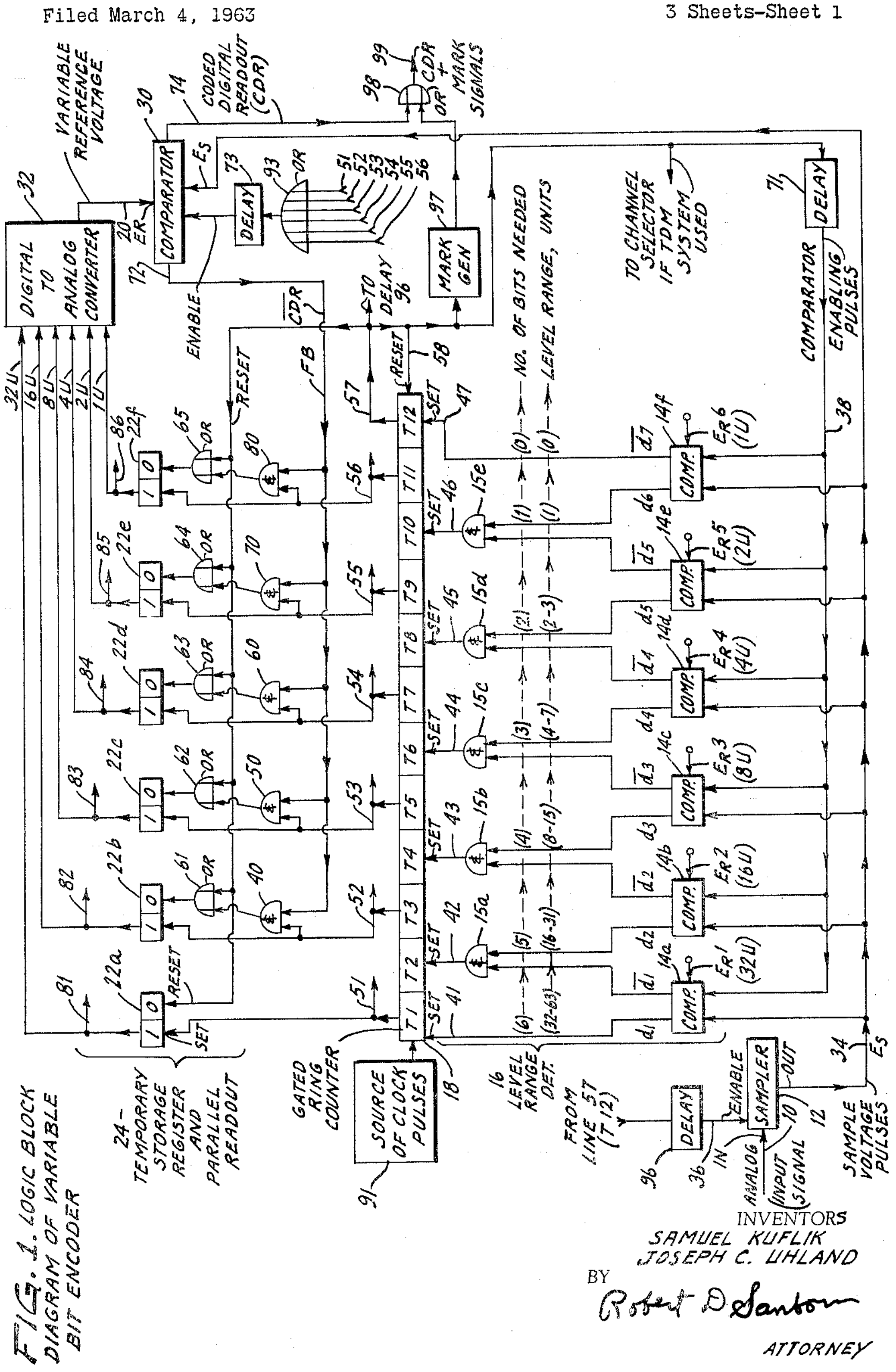
FIG. 1. LOGIC BLOCK DIAGRAM OF VARIABLE BIT ENCODER
INVENTORS
SAMUEL KUFLIK
JOSEPH C. UHLAND
BY Robert D. Santon
ATTORNEY APERIODIC PULSE CODE MODULATOR OR ANALOG TO DIGITAL CONVERTER
Filed March 4, 1963 3 Sheets-Sheet 2
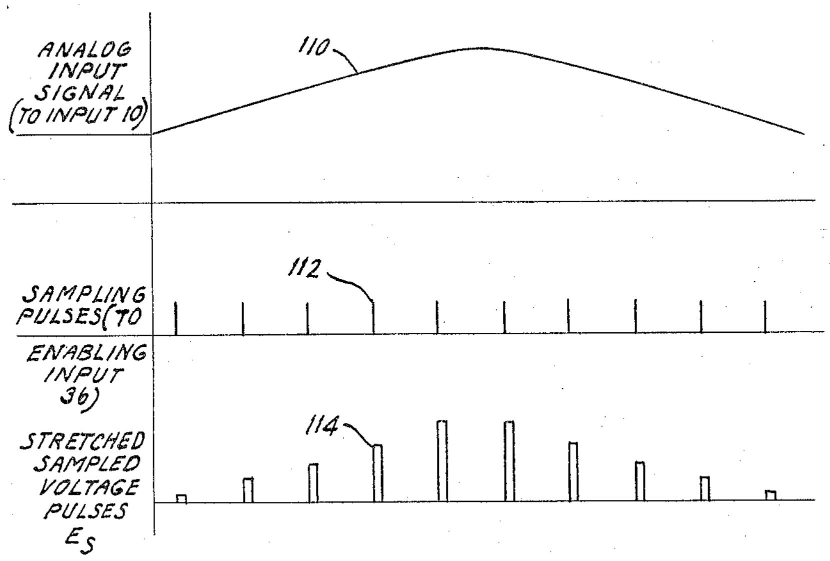
FIG. 1A.
WAVEFORMS IN SAMPLER 12
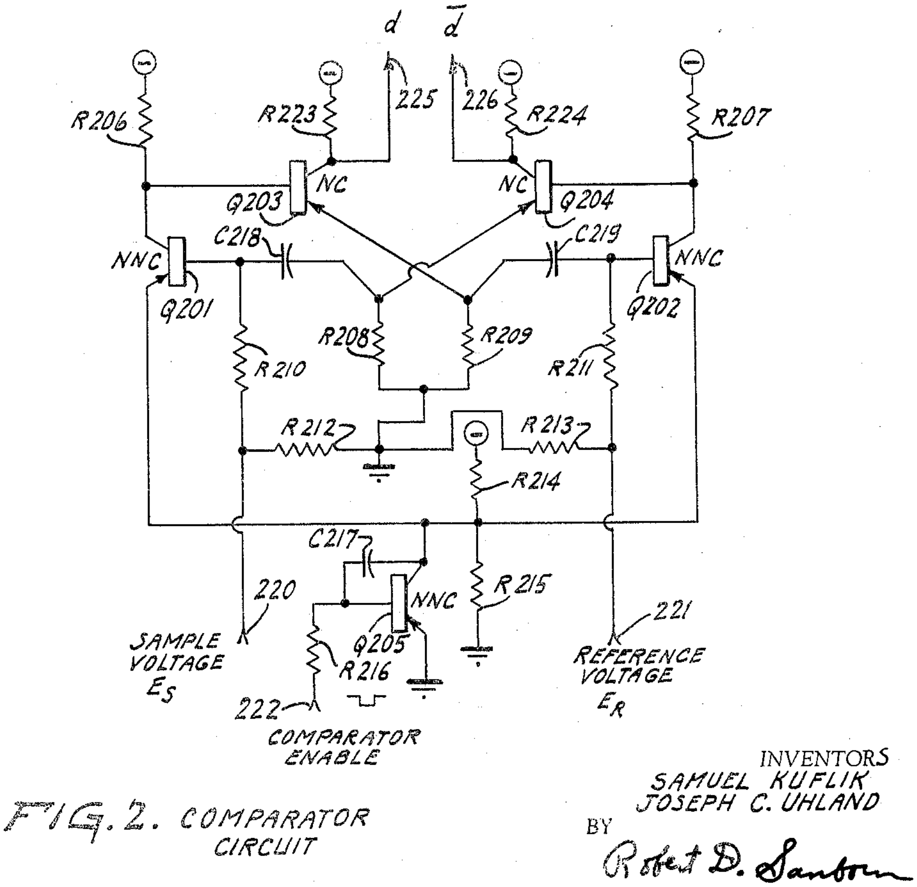
FIG. 2. COMPARATOR CIRCUIT
INVENTORS
SAMUEL KUFLIK
JOSEPH C. UHLAND
BY Robert D. Sanborn
ATTORNEY APERIODIC PULSE CODE MODULATOR OR ANALOG TO DIGITAL CONVERTER
Filed March 4, 1963 3 Sheets-Sheet 3
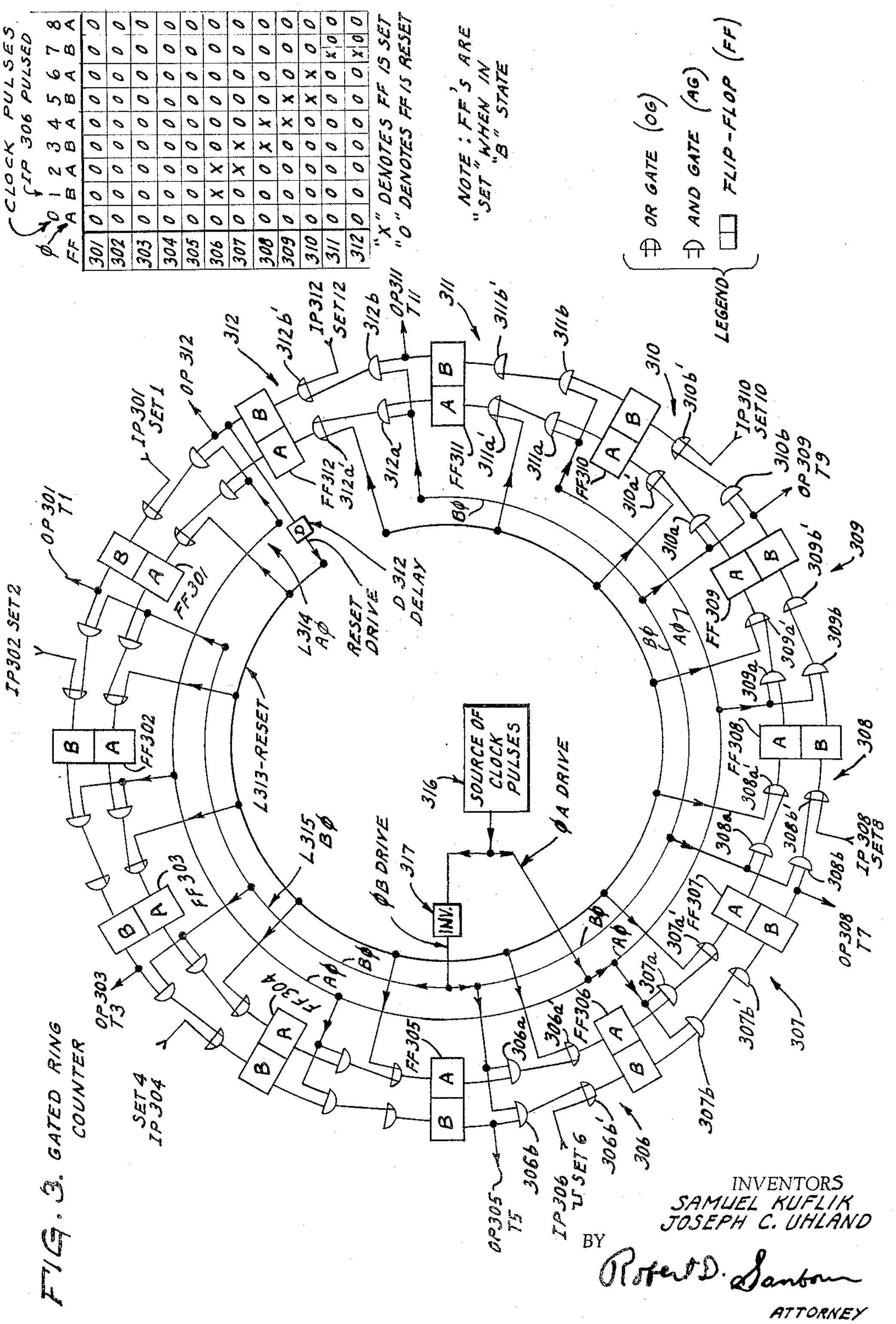
FIG. 3 GATED RING COUNTER
INVENTORS
SAMUEL KUFLIK
JOSEPH C. UHLAND
BY Robert D. Sanborn
ATTORNEY

United States Patent Office 3,241,135
Patented Mar. 15, 1966

3,241,135

APERIODIC PULSE CODE MODULATOR OR ANALOG TO DIGITAL CONVERTER

Samuel Kuflik, New York, N.Y., and Joseph C. Uhland, Merchantville, N.J., assignors to Philco Corporation, Philadelphia, Pa., a corporation of Delaware Filed Mar. 4, 1963, Ser. No. 262,488
20 Claims. (Cl. 340—347)

This invention relates to encoders, and more particularly to a system for translating analog or variable-amplitude pulses into coded groups of constant-amplitude pulses or digital "bits." Such an encoder, although not limited thereto, finds advantageous application in a Pulse Code Modulation (PCM) system in conjunction with time division multiplex equipment, and will be described as part of such a system for exemplary purposes. It will be appreciated by those skilled in the art, however, that the encoder to be described will also find application in many other types of digital information systems, including computers and data storage/retrieval systems.

The present PCM system is uniquely characterized by its aperiodic mode of operation. Prior operational PCM encoders have operated in the periodic mode, i.e., by providing a fixed number of output "bits" for each analog input pulse. Since low-level analog pulses can be represented by fewer bits than pulses of maximum amplitude, the prior mode of operation is wasteful in requiring a bit group of fixed size for each analog pulse, regardless of its amplitude. The present system is aperiodic in that it provides a variable number of bits per analog pulse, the number being proportional to the amplitude of the pulse. It will be appreciated that an aperiodic encoder is more efficient than a periodic encoder because the average size of the generated bit groups will correspond to the average rather than the maximum amplitude of the analog pulses. Since the average level of speech is far below its maximum amplitude, the use of an aperiodic encoder in connection with speech will effect a far more efficient encodation.

This efficiency characteristic of the invention is extremely valuable in connection with radio information transmission systems such as multiplexing and telemetering, where time bandwidth-product considerations demand that highly efficient use be made of the available portion of the electromagnetic wave spectrum. Since the asynchronous encoder to be described does not require a fixed transmission time to encode each analog information pulse, it is ready to encode additional pulses as soon as sufficient bit time has elapsed to encode a prior pulse, and thus more information can be squeezed into a given bandwidth.

When the aperiodic encoder is used in conjunction with time division multiplex systems (in which a plurality of information channels are sequentially sampled and encoded) more channels can be sent over a fixed bandwidth, or a narrower bandwith can be used to carry a fixed number of channels. As soon as the necessary number of bits to encode an analog sample of one channel have been supplied, a mark pulse will be transmitted and an analog sample of the next channel will immediately be taken and encoded. The mark pulse will, of course, also synchronize the transmitter with the receiver.

OBJECTS

The objects of the invention thus include:

(1) The provision of a new and improved analog-to-digital converter, (2) The provision of a novel and improved PCM system, (3) The reduction of time bandwidth product requirements of PCM systems, and (4) The provision of a more efficient modulating and multiplexing system.

Other objects and advantages of the invention will become apparent from a consideration of the following summary and detailed description thereof.

SUMMARY

An analog pulse is encoded in digital form according to the invention by first determing its level range in order to program the exact number of output bits which will be necessary to represent the pulse in coded digital form. The exact level of the pulse is then used to determine the code structure of the now preset number of bits of the output signal. An appropriate marker signal is provided after a pulse is encoded to synchronize the decoder and to select a new pulse for encoding.

Drawings:

FIG. 1 depicts, in block diagram-form, encoder apparatus according to the invention, FIG. 1A depicts certain voltage waveforms present in the system of FIG. 1, FIG. 2 depicts a circuit diagram of the comparators used in the system of FIG. 1, and FIG. 3 depicts a circuit diagram of the gated ring counter of FIG. 1.

FIGURE 1.—STRUCTURE

The structure of the encoding apparatus, diagrammatically depicted in the drawing, will now be described.

A sampler 12, which receives a unipolar analog input signal at input 10 has its output connected to comparator 30 and to comparators 14*a* to 14*f*. Any type of analog signal whose range lies within fixed limits and whose reference level is selected to render it unipolar with respect to the reference level of the encoder may be applied to input 10. The sampler also has an enabling or command input at 36 supplied, via delay unit 96, from the output of stage T12 of gated counter 18.

Comparators 14*a* to 14*f*, in addition to being supplied in parallel, via line 34, with the output of sampler 12, also receive D.C. reference voltages on inputs $E_{R1}$ to $E_{R6}$ which are weighted in values proportional to the powers of two, from 32 units (32*u*) down to 1 unit, as shown. The comparators 14 also receive a parallel enabling signal on line 38, from stage T12 of gated counter 18 by way of delay unit 71. Each comparator has complementary outputs (e.g., d1 and $\overline{d1}$) which are connected to gates 15*a* and to counter input lines 41 and 47 as in the manner indicated. It may be noted that the comparator outputs are logically interconnected to the inputs of gates 15*a*–15*e* such that each gate receives the complementary or inverted output from one comparator and the direct output from the succeeding comparator. The schematic diagram of a comparator suitable for use for comparators 14 is shown in FIG. 2 of the drawings.

The gates 15*a* to 15*e* supply the "set" inputs (via lines 42 to 46) to stages T2 to T10 of gated counter 18, which also has inputs from lines 41 and 47 for the "set" inputs of stages T1 and T12. Counter 18 is also supplied with clock pulses from source 91. Comparators 14 and gates 15 together constitute a level range detector 16.

Gated ring counter 18 has outputs (lines 51 through 56) from odd stages T1 through T11 and even stage T12. Lines 51 to 56 are connected to respective inputs of OR gate 93 as indicated, and to the set inputs of flip-flops 22*a* through 22*f* in register 24. Lines 52 through 56 are also connected to one input of each of the AND gates 40, 50, 60, 70, and 80. Line 57 (the output of the last stage T12) is connected to the reset inputs of flip-flops 22a through 22f (with OR gates 61 through 65 being interposed with respect to flip-flops 22b through 22f), to the reset input 58 of counter 18, to delay unit 96 which is connected to sampler 12, to a channel selector (not shown), to mark generator 97, and to delay unit 71, the output of which is the comparator enabling line 38. The schematic diagram of a counter suitable for counter 18 is shown in FIG. 3.

The other input of AND gates 40, 50, 60, 70, and 80 (line 90) is derived from inverted output 72 of comparator 30. The outputs of the AND gates 40, 50, 60, 70, and 80 are connected to reset inputs of flip-flops 22b to 22f through OR gates 61 to 65.

Flip-flops 22a to 22f have outputs 81 to 86 which are connected to digital-to-analog converter 32. The flip-flop outputs 81 to 86 may be used for parallel readout purposes if desired, inasmuch as the voltages present thereon will represent a digital code corresponding to the analog input sample.

Comparator 30 compares an input $E_R$ on line 20 from converter 32 with an input $E_S$, obtained from sampler 12, on command of the output of OR gate 95, which is first delayed in delay unit 73. The output 74 of comparator 30 will be a series of digital pulses representative of the analog input sample and hence is the series coded digital readout (CDR) of the system of FIG. 1. An inverted version 72 of the comparator output ($\overline{\text{CDR}}$) is fed back to AND gates 40, 50, 60, 70, and 80. CDR output 74 and the output of mark generator 97 are fed to OR gate 98, whose output alternately will consist of mark signals and coded groups of digital pulses.

FIGURE 1.—OPERATION

*Broad function*

The broad function of the encoder shown in the drawing is summarized as follows: The analog input signal present at input 10 (e.g., from a voice channel) is sampled aperiodically in the sampler 12. Each sampler output pulse $E_s$ on line 34 is converted by the encoder into a coded group of representative digital bits, available at the digital readout line 74. The number of bits in the group is proportional to the magnitude of the analog sample pulse and is not fixed, as was the case with prior art encoders. As soon as the necessary number of bits to encode one analog sample pulse have been generated, a new sample will immediately be taken for subsequent encodation.

*Overall operation*

The overall operation of the encoder can be briefly summarized as follows: The analog sample pulse $E_s$ is applied, via line 34, in parallel to the comparators 14a to 14f in the level range detector 16. Due to the logical connections between comparators 14a to 14f, gates 15a to 15e, and lines 41 to 47 only one line in the group 41 to 47 will be energized when a sample analog pulse $E_s$ is applied to the comparators. Said energized line is representative of the level range of the analog pulse, and hence, the number of output bits required. The particular enabled line starts the gated counter 18 counting down from the stage to which the line is connected. The counter acts as a commutator or distributor to sequentially energize the lines 51 to 57 which are connected to and sequentially set the stages 22a–22f in the temporary storage register 24. The outputs of storage register 24 cause the digital-to-analog converter 32 to supply a series of short increasing amplitude reference pulses $E_R$ on line 20 which are compared, in comparator 30, with the sampled pulse $E_s$ to obtain the coded series digital readout from the comparator. The output of the comparator in inverted form is also fed back to selectively reset stages in register 24, whereby the proper $E_R$ reference pulses may be generated. At the end of an encodation a mark signal is generated in mark generator 97 and combined with the coded digital readout in summation unit 99.

*Detailed operation*

The detailed operation of the encoder may be best described by a series of steps as follows:

(1) A sampled analog pulse $E_s$ generated in sampler 12 is supplied, on line 34, to comparators 14a to 14f. Each comparator is also supplied with one of a plurality of fixed reference voltages $E_{R1}$ to $E_{R6}$, whose values are proportional to the powers of two and are assigned as shown from 32 units down to 1 unit. The maximum value of the analog input signal which can be encoded is 63 units. It thus will be apparent that the encoder can quantize the analog pulse into 64 levels. Any other quantization figure may be readily selected as desired, however, by adding or subtracting stages in each functional unit of the encoder.

(2) Each of the comparators has complementary outputs, e.g., $d4$ and $\overline{d4}$, which are connected in the manner indicated to AND gates 15a to 15e, as well as lines 41 and 47. Those comparators which are supplied with a reference voltage $E_R$ which is less than $E_s$ produce a binary ONE output at their non-complement leads (e.g., $d4$) and a binary zero at their complement leads (e.g., $\overline{d4}$). As is well known, a ONE and a ZERO, respectively, may be represented by any two different voltages, e.g., two positive voltages of different amplitudes, two negative voltages of different amplitudes, a positive and a negative voltage, or a positive or negative voltage and ground or reference potential. Those comparators whose reference voltage $E_R$ is greater than $E_s$ produce an output which is the converse of the former comparators, e.g., a ZERO at $d3$ and a ONE at $\overline{d3}$. Due to the logical interconnections of comparators 14a to 14f with gates 15a to 15e and lines 41 and 47, only one of the lines 41 to 47 will be energized for any value of sample pulse. For example, if $E_s$ is equal to 5 units in potential, i.e., 5/63 of maximum amplitude, a ONE output will appear at $\overline{d1}$, $\overline{d2}$, and $\overline{d3}$, as well $d4$, $d5$, and $d6$. Only gate 15c has inputs ($\overline{d3}$ and $\overline{d4}$) which are both coupled to comparators with ONE outputs; thus only gate 15c will provide an output and only line 44 will be energized. The level range detector 16 thus determines the rough level range of the analog sample $E_s$ and enables one of lines 41 to 47 accordingly.

(3) The gated counter 18 is initially reset so no stage thereof (T1–T12) is on and no output line therefrom (51–57) is energized. The counter 18 functions so that a pulse on any of its "set" inputs 41 to 47 turns on the associated stage of the counter and enables the source of clock pulses 91 to cause the counter to count down from the stage which had been set. Continuing with the exemplary case wherein line 44 was energized due to a 5 unit $E_s$ input pulse, it will be seen that line 44 will energize stage T6 of the counter. The next clock pulse will cause stage T7's output line 54 to become active, whereafter stage T9's output line 55 will become the active line 2 clock pulses later, etc. Thus the counter functions as a distributor so that each of the odd numbered stages, T1 to T11, plus the last stage T12, will be sequentially activated to sequentially energize lines 51 to 57.

(4a) The remaining steps in the operation of the encoder are similar to those of a conventional feedback type encoder except that initial energization of storage register 24 hereof is begun at a variable most significant stage as determined by the height of the analog sample $E_s$ rather than at a fixed most significant stage. In this way only the number of bits actually necessary to generate an output signal will be supplied, rather than a fixed, and usually larger, number of bits. For example, in response to the analog sample having 5 units of amplitude, a prior art encoder would generate the PCM signal "000101."

$$(0\times 32+0\times 16+0\times 8+1\times 4+0\times 2+1\times 1)$$

but the present encoder would operate to bypass the first three stages of the storage register and generate the shorter but similar and equivalent PCM signal "101." In order that these remaining steps in the operation of the encoder may be understood without reference to the prior art a brief explanation thereof will now be given.

(4b) The flip-flops 22*a* to 22*f* in the temporary storage register 24 are all reset to their "0" states. The first stage of the counter 18 to have an output (as determined by the level range detectors 14 and lines 41 to 47) places its associated flip-flop in the register in its "1" state, causing a "1" to be supplied to the analogous section of the digital-to-analog converter 32. Continuing with the exemplary case, initially energized line 54 will set the flip-flop 22*d* in its "1" state and the associated output lead 84 of flip-flop 22*d* will energize the associated section of the D/A converter 32.

(5) The D/A converter operates to supply an analog voltage on lead 20 equal to the sum of the levels of the activated stages of the register 24. For example, if flip-flop 22*d* (representative of "4") and flip-flop 22*e* (representative of "2") are in their "1" states, converter 32 will cause line 20 to have 4+2=6 units of voltage thereon. Energization of line 54 in the exemplary case under discussion will cause line 20 to have 4 units of pulse voltage thereon.

(6) The pulse on line 20, $E_R$, is compared in comparator 30 with the sample pulse $E_s$ on command of an output from lines 51 to 57 supplied through OR gate 95 and delay 73 and a decision is made. If $E_s \geqq E_R$ the coded digital readout (CDR) at 74 terminal will be a binary ONE, but if $E_s < E_R$, the CDR will be ZERO. In the instant exemplary case $E_R = 4$ and $E_S = 5$; therefore the CDR will be a ONE. Delay unit 73 compensates for the time required for one of the flip-flops 22*a* to 22*f* to switch plus the time required for operation of converter 32.

(7) An inverted version of the CDR (output 72) is fed back in parallel on line 90 to AND gates 40, 50, 60, 70, and 80. This feedback, in conjunction with the voltage on lines 51 to 56, will selectively reset the flip-flops 22*a* to 22*f* in the register 24 so that proper sequence of $E_R$ voltages may be supplied to comparator 30, whereby the correct output code will be generated at 74. The operation of the feedback circuit may be best understood by continuing with the exemplary case. The 4 unit $E_R$ pulse on line 20 has just been compared with the 5 unit $E_s$ pluse to generate a ONE at terminal 74. This is the first bit of the output code "101" which must be generated to encode the 5 unit $E_s$ analog pulse. An inversion of this ONE, or ZERO, is also supplied at output terminal 72 of comparator 30. The ZERO is supplied on feedback line 90 in parallel to one input of each of the AND gates 40 and 80. None of the AND gates 40 to 80 will be activated because at least one input of each is deenergized due to the ZERO on line 90. Flip-flop 22*d* will thus remain set since AND gate 60 cannot supply a reset output thereto.

(8) Stage T9 and line 55 will now be energized (stage T7 being turned off during normal operation of counter 18) and flip-flop 22*e* as well as flip-flop 22*d* will now be set. Lines 84 and 85 will energize converter 32 so that $E_R$ will now be at 6 unit pulse and since $E_s$ still equals 5 units, the second bit of the CDR will be a ZERO and line 90 ($\overline{\text{CDR}}$) will be energized with a ONE. The ONE on line 90 will appear before the source of clock pulses switches the counter from stage T9 to stage T10, so that AND gate 70 will receive inputs from lines 90 and 55. AND gate 70 will have an output which will reset flip-flop 22*e* (via OR gate 64) to its "0" state.

(9) Line 56 will next become energized and set flip-flop 22*f* to its "1" state. Since flip-flop 22*d* and flip-flop 22*f* are the only ones now set, $E_R$ will be a 5 unit pulse, and since $E_R$ now is equal to $E_s$, the CDR will be a ONE and thus the encodation "101" will be completed.

(10) When stage T12 becomes energized the following events will occur due to the pulse which will be supplied on line 57:

(a) The stages of register 24 will be reset because the pulse on line 57 will be supplied to their reset inputs (via OR gates 61 to 65 with respect to stages 22*b* to 22*f*).

(b) Counter 18 will be reset via line 58.

(c) Mark generator 97 will generate an appropriate signal marker (e.g., one of greater amplitude than the bit pulses) to separate adjacent groups of coded bits and synchronize the receiver with the transmitter. The marker signals and the coded groups of digital pulses are supplied to the two inputs of isolating OR gate 98, so that they can both be fed on line 99, which may be coupled to a modulator if the coded information is to be transmitted in radio fashion.

(d) The pulse from output 57 is also supplied to delay unit 96, whose delay is about equal to the temporal width of the mark signal (advantageously equal to 1 bit). After this delay the pulse is fed to enable input 36 of sampler 12 so that a new analog sample will be taken at an appropriate time whereby a corresponding new group of digital pulses will immediately follow the marker signal from generator 97.

(e) When the encoder is used in conjunction with time division multiplex equipment line 57 will also be coupled to a channel selector (not shown) which will switch a new channel to input 10 of sampler 12.

(f) The pulse on line 57 is lastly fed to delay unit 71, whereafter it is supplied to enable line 38 to enable comparators 14*a* to 14*f* at the appropriate time.

*Sampler 12*

In order to generate analog sample pulses $E_s$ of sufficient duration for comparator 30 to make a maximum of 6 comparisons therewith, sampler 12 must take relatively wide sample pulses from the analog input signal which is applied at input 10. The enabling signal pulses applied at input 36 of sampler 12 are relatively short. Nevertheless sampler 12 can be constructed so that it will take wide samples, even if a relatively short trigger is applied. Alternatively, the enabling pulses to sampler 12 can be stretched (e.g., by a monostable multivibrator) if sampler 12 is of the type that will not take samples wider than its enabling signal pulses.

This is illustrated in FIG. 1A wherein shown a portion of the analog input signal (waveform 110), the narrow sampling pulses to the enabling input 36 of sampler 12 (waveform 112), and the stretched sampled analog voltage pulses (waveform 114).

*Mark generator 97*

The mark signal generator 97 may be alternatively arranged to generate a diphase marker signal of twice the bit frequency as shown and discussed in the copending application of the instant inventors, Ser. No. 262,776, filed Mar. 4, 1963, and assigned to the assignee of the present invention. Such a marker signal consists of a pulse and a space which may be in alternative order, the width of each equal to half that of a bit pulse or space. The advantage in using this diphase marker lies in its ability to provide an additional bit of information which will be carried by the composite output signal delivered to point 99. This "bit" of information may be a polarity indication, whereby the polarity of the prior encoded analog sample may be indicated. For example, if the aforenoted pulse lags the adjacent space a positive sign will be indicated, and if the pulse leads the space a negative sign will be indicated.

This arrangement may be implemented as follows: The analog signal applied to point 10 may be balanced around ground (instead of unipolar) and sampler 12 must be arranged to provide bipolar sample pulses $E_S$. A unidirectional inverter (not shown) must be interposed between sampler 12 and comparators 14*a* to 14*f* so that said comparators will still receive unipolar analog samples. Mark generator 97 must of course, be arranged to generate the aforenoted diphase signal and hence a lead (not shown) must be provided to connect the bipolar analog sample pulses thereto. For a polarity-negative indication the mark generator may simply be arranged to supply a pulse whose width is half that of a bit pulse immediately upon termination of the generated group of bit pulses; the generation of a subsequent group of bit pulses being delayed by suitable adjustment of delayer 96 in order to provide the lagging space for the complete marker signal. For a polarity-positive indication a positive sample pulse $E_s$ from sampler 12 should be arranged to cause the aforenoted half-bit mark pulse to be delayed for a half-bit with the subsequent group of mark pulses following immediately thereafter.

Alternative modes of generating the diphase mark signal will be apparent to those skilled in the art.

FIGURES 2 AND 3

The various functional elements shown in block form in FIG. 1 are all conventional and readily obtainable. However, exemplary schematics of the preferred forms of certain of the more sophisticated elements in FIG. 1 will now be described.

(1) FIGURE 2.—COMPARATOR CIRCUIT

*Application*

The comparatorof FIG. 2 may be used for the comparators 14 and the comparator 30 of FIG. 1.

*Function*

The comparator of FIG. 2 compares a sample voltage pulse $E_s$ which is applied at input 220, with a reference voltage $E_R$ which is applied at input 221, on command of a comparator enabling pulse which is applied to input 222. If $E_s$ is equal to or greater than $E_R$, noncomplementary output terminal **225*d* will supply a negative pulse while complementary terminal 226*d*** will remain at ground; if $E_R$ is greater than $E_s$ the converse will occur. The comparator of FIG. 2 is extremely fast in operation and recovery. It should be noted that negative voltages are used throughout the apparatus of the invention; consequently "greater" means "more negative" and "energized" or "signal present" denotes the presence of a negative voltage, as opposed to a ground.

*Construction*

The structure of the FIG. 2 comparator is evident from an inspection of the schematic diagram and will not be discussed in detail. The circuit includes five PNP transistors, Q201 to Q205, resistors, capacitors, and a single source of negative bias potential as indicated by the encircled minus (—) sign. The circuit is analogous to an astable multivibrator with Q201 and Q202 being the main transistors, Q203 and Q204 being emitter followers in the cross-coupling paths, and Q205 being an enabling or switching transistor.

*Operation*

*"Ready" conditions.*—Initially the five transistors are in the states indicated by their lengends "NC" (normally conducting) and "NNC" (normally nonconducting). Q203 and Q204 are conducting because of the negative biases applied to their bases via R206 and R207 and the ground applied to their emitters via R208 and R209. Q201 and Q202 are not conducting because their emitters receive a negative bias via R214, while their bases are connected to ground via R210–R212 and R211–R213, respectively. A negative reference voltage may or may not be present at input 221; however even if the one is present Q202 will not conduct because the negative bias applied to its emitter via R214 is made greater than any possible value of reference voltage applied to its base via input 221. Q205 will not conduct because there is no signal applied to its base.

*Comparison operation.*—When input 222 receives an enabling signal, Q205 is driven into conduction, connecting the emitters of Q201 and Q202 to ground potential. At this point it will be apparent that the connections for a conventional astable multivibrator with emitter followers Q203 and Q204 in the cross-coupling path have been completed. Q201 and Q202 are the main switching transistors, and due to the cross-coupling connections from the collector of one transistor to the base of the other (through the emitter followers Q203 and Q204 and capacitors C218 and C219), the transistors 201 and 202 will tend to proceed to opposite states of conduction once the circuit is enabled. The emitter followers, Q203 and Q204, must also proceed, their states of conduction being opposite to that of the transistor to whose collector their base is connected.

The comparison input voltages $E_s$ and $E_R$ determines which transistor, Q201 or Q202, will be driven into conduction. If for example $E_s$ is greater than $E_R$, Q201 will be driven into conduction before the negative signal $E_R$, applied to the base of Q202, can be effective to turn Q202 on. The cross-coupling signal applied to the base of Q202, via C219, will be greater than the reference signal applied via R211, and Q202 will not be turned on. Q204 will remain on, but Q203 will turn off since the collector of Q201 has risen toward ground as Q201 turns on. With Q203 nonconducting and Q204 conducting, point 225 will assume a negative potential while point 226 will remain near ground.

When Q203 is turned off C219 will become charged. Before the charge on C219 can leak off and thus allow the circuit to begin to oscillate in the fashion of an astable multivibrator, the enabling pulse applied to input 222 will terminate and the circuit will be disabled before the transistors can switch states for such oscillation.

If $E_R$ is greater than $E_s$, the converse of the above described operation will take place, with Q202 being turned on. R211 should be made slightly larger than R210 so that a negative pulse will appear at terminal 225 if $E_s$ and $E_R$ be equal.

(2) FIGURE 3.—GATED RING COUNTER

The gated ring counter of FIG. 3 may be used for the gated ring counter 18 of FIG. 1. The symbols used in the following discussion are defined as follows:

| | |
|---|---|
| OG | OR gate. |
| AG | AND gate. |
| IP | Input. |
| OP | Output. |
| FF | Flip-flop. |
| D | Delayer. |

The gated ring counter is used as a pulse distributor which will sequentially energize a plurality of its outputs upon receipt of an initiating signal at one of its inputs. The number of outputs energized is determined by the location at which the initiating signal is applied. For instance, when IP306 receives a pulse, OP308, OP309, OP311, and OP312 will be sequentially energized and deenergized. The stages in the counter will be reset immediately after OP312 is energized, and distribution will be halted.

*Construction*

The construction of the gated ring counter is largely evident from an inspection of the drawing and will be briefly discussed only. Each stage of the counter (e.g., stage 309) includes a flip-flop (FF309) having two inputs and two outputs. Each of the two inputs are connected, respectively, to the outputs of two OR gates, **309*a'* and 309*b'*. The two outputs are respectively connected to one input of each of two AND gates, 310*a* and 310*b***. The other inputs of AG310*a* and AG310*b* are obtained from the B$\phi$ line 315. The outputs of AG310*a* and AG310*b* are connected respectively to the inputs of OG310*a'* and OG310*b'*. OG310*a'* also has an input connected to the reset line 313. OG310*b'* is also provided with an external input IP310. An output, OP309 is obtained from the B side of FF309. It will be noted that Aφ line 314 is connected to one of the inputs of all of the odd-numbered AND gates, while Bφ line 315 is connected to one of the inputs of all of the even-numbered AND gates. Aφ line 314 is directly supplied by pulses from clock pulse source 316 and Bφ line 315 is supplied with a complementary phase of clock pulses via inverter 317. All of the stages of the ring counter are identical as are the interstage connections, except for the aforenoted alternative connections of the Aφ and Bφ lines. Also the output of stage 312 is fed to delayer 312 and thence to reset line 313.

*Operation*

Initially all of the flip-flops of the counter are "set" or in their "A" states. Clock pulse source 316 is continuously supplying in-phase pulses to Aφ line 314 and, via inverter 317, complementary-phase pulses to Bφ line 315. The flip-flops in the counter remain in their "A" states because the clock pulses on the Aφ and Bφ lines supply only one input to the AND gates associated with each stage, and none of the AND gates which are connected (through an OR gate) to the inputs of the "B" sides of the flip-flops receives a second input.

The distributing operation of the counter may be best explained by describing the steps of an exemplary case wherein IP306 is pulsed. Reference is made to the table accompanying FIG. 3 which shows the states of the flip-flops in the counter during each ½ cycle of clock pulses for this exemplary case. The numbers at the top of the table correspond to the following step numbers:

(1) Actuation of IP306 will immediately set FF306 via OG306*b′*. FF306 will produce an output and supply one of the inputs of AG307*b*. (The "A" side of FF306 is simultaneously pulsed since Bφ line 314 is also active, but the flip-flops are of the type that will change their state when both injuts are pulsed, so that FF306 will in fact be set to its "B" state.)

(2) During the next temporal interval the Aφ line 315 is active. AG307*b* will receive two inputs and energize OG307*b′*, which will set FF307. OP308 will be energized and AG308*b* will receive one input. As the chart shows, two flip-flops 306 and 307 are now set.

(3) During the next interval the pulse on the Bφ line will set FF308 through AG308*b* and OG308*b′*. Also the Bφ line will reset FF306 via AG306*a*, since AG306*a* already is receiving one input from the "A" side of FF305. AG306*a* will produce an output which will pass through OG306*a′* to reset FF306. Now FF306 and 307 are set.

(4–6) The next three steps in the operation of the distributor progress in the same manner as did the previous steps; the states of the flip-flops are indicated in the table. It should be noted that OP308 becomes deenergized during the fifth step; thus it will be apparent that an individual output terminal is energized for an interval equal to 1 cycle of clock pulses.

(7) During the first part of the seventh interval after IP306 was pulsed, FF310 will be reset, FF312 will be set, and OP312 will be energized in the manner discussed or the previous stages. However the output of the "B" side of FF312 will also be fed to delayer 312 and thence to reset line 313. Reset line 313 will reset every set stage when it is energized (after the output of FF312 is delayed in D312) since it is connected to the "A" side of every flip-flop via an OR gate. D312 should be chosen to delay a pulse for less than a half cycle so that all of the stages may be reset before the Aφ line is energized at the start of interval 8. FF311 and 312 will thus be set for only a portion of the 7th interval, as the chart indicates.

As will be evident, a similar, albeit longer or shorter, sequence of operation will occur if an input other than IP306 is pulsed. For a fuller discussion of counter theory, including a discussion of flip-flop and gate circuitry reference is made to the Ingerman Patent 3,054,059, Sept. 11, 1962, 328–42, assigned to the assignee of the present invention.

The instant invention is not to be limited by the specificities of the foregoing description since many modifications thereof which fall within the true scope of the inventive concept will be apparent to those conversant with the art. The invention is defined only by the appended claims.

We claim:

1. In combination:

(a) a source of analog pulses, (b) first means for providing an output indicative of the amplitude range of each of said pulses, (c) second means for providing a coded group of amplitude-representative digital bits in response to each of said pulses, the number of bits in each group being determined by the output of said first means.

2. The combination of claim 1 wherein said source of analog pulses comprises a sampler supplied with a continuous analog signal and a train of sampling pulses.

3. The combination of claim 2 wherein said first means comprises:

(a) a plurality of voltage comparators supplied in parallel with said analog pulses and a plurality of reference voltages, and (b) a plurality of AND gates logically connected to the outputs of said comparators.

4. The combination of claim 3 wherein means are provided for supplying a mark signal between each coded group of digital bits.

5. An aperiodic pulse code modulator comprising, in combination:

(a) first means for supplying an analog signal, (b) second means for deriving samples of said analog signal, (c) third means for providing output signals respectively indicative of the amplitude range of each of said samples, (d) fourth means for providing groups of digital bits respectively indicative of the amplitude of each of said samples, the number of bits in said groups being controlled by the respective output signals of said third means, said fourth means also arranged to control said second means.

6. The modulator of claim 5 wherein said third means comprises: (1) a series of voltage comparators, arranged to receive said samples and respectively supplied with progressively increasing reference voltages, and (2) a plurality of coincidence gates logically interconnected to the outputs of said comparators.

7. In an analog pulse to coded digital bit converter of the type wherein an analog pulse initiates operation of a multi-stage distributor whose output programs a feedback type encoder which includes coincidence gates, flip-flops, and a voltage comparator, an improvement for initiating operation of the distributor at a variable stage location corresponding to the amplitude of the analog input pulse, whereby only the number of digital bits necessary to represent said pulse will be generated, comprising: means for detecting the level range of said analog pulse and initiating operation of said distributor at a variable location such that the number of stages activated is proportional to the magnitude of said analog pulse.

8. The converter of claim 7 wherein said means includes a plurality of voltage comparators supplied in common with said analog pulse.

9. Apparatus for generating in response to variable amplitude analog pulses coded groups of digital bits, said apparatus comprising:

(a) means for determining the amplitude range of said pulses, (b) distributing means having a plurality of outputs which are sequentially energized upon initial activation by said amplitude range determining means, the number of outputs energized being proportional to the magnitude of the amplitude range of said pulses, and (c) feedback encoding means responsive to said pulses and the outputs of said distributing means for generating coded groups of digital bits representative of the amplitudes of said analog pulses, wherein the number of pulses in each of said groups is determined by the number of energized outputs of said distributing means.

10. Apparatus as in claim 9 wherein said means under clause (a) comprises a plurality of voltage comparators, each of which is supplied with a different reference voltage.

11. Apparatus as in claim 9 wherein said analog pulses are generated by sampling a continuous analog signal in sampling means which is responsive to an output of said distributing means.

12. An aperiodic analog to digital converter arranged to receive a series of analog pulses and generate a coded group of amplitude-representative digital bits in response to each of said pulses wherein the amplitude range of each analog pulse determines the number of bits in each group, said converter comprising:

(a) a level range detector having a plurality of outputs respectively representative of a plurality of amplitude ranges and arranged to supply in response to each analog pulse, a signal at the output representative of the amplitude range of said analog pulse, (b) a distributor having: (1) a plurality of inputs respectively connected to the outputs of said level range detector, and (2) a plurality of outputs arranged to be sequentially energized upon activation of said distributor by said level range detector, the number of outputs energized being determined by whichever output of said level range detector supplies said signal, and (c) means, responsive to the outputs of said distributor and said analog pulses, for generating said amplitude-representative coded group of digital bits in response to each analog pulse, the number of bits in each group being determined by the number of outputs of said distributor which are energized.

13. The converter of claim 12 wherein said series of analog pulses is derived by sampling a continuous analog signal.

14. The converter of claim 12 wherein said level range detector comprises a plurality of voltage comparators logically interconnected with a plurality of AND gates.

15. The converter of claim 12 wherein means are provided for supplying a mark signal between adjacent groups of digital bits.

16. Apparatus for generating in response to an analog input pulse a variable-bit digital output code, comprising:

(a) a plurality of voltage comparators, each referenced to a progressively increasing voltage and supplied in common with said analog pulse, whereby those comparators whose reference voltages are less than the amplitude of said analog pulse supply an output different from the remainder of the comparators, (b) logical interconnection means connected to the outputs of said comparators and provided with output leads representative of the respective ones of said comparators, said logical interconnecting means being arranged to energize only the lead corresponding to the comparator referred to the highest voltage which does not exceed the amplitude of said analog pulse, (c) a gated counter supplied with clock pulses and having inputs of alternate stages connected to said plurality of leads, whereby energization of one said leads initiates successive activation of the stages of said counter, beginning with the stage to which said energized lead is connected, (d) a plurality of flip-flops, each representing one of said progressively increasing reference voltages under clause (a) and having set inputs connected to the outputs of alternate stages of said counter, whereby said flip-flops may be successively set upon operation of said counter, (e) a digital to analog converter having a single output and a plurality of inputs connected to the outputs of said flip-flops for providing successive output analog voltages corresponding to the sum of the reference voltages represented by the set flip-flops, (f) a voltage comparator having one input connected to the output of said digital to analog converter and one input supplied with said analog pulse, and having an output, and (g) a plurality of coincidence gates, one input of each being connected in common to the output of said comparator recited in clause (f), the other input of each being connected to the outputs of alternate stages of said counter, and the output of each being connected to reset inputs of said flip-flops, whereby said flip-flops may be selectively reset during operation of said counter and so that a digital code corresponding to the amplitude of said analog pulse and quantized according to said reference voltages will appear at the output of said comparator recited in clause (f).

17. Apparatus as in claim 16 wherein the magnitudes of said reference voltages are proportional to the powers of the number two.

18. Apparatus as in claim 16 wherein the output of the last stage of said counter is connected to operate a sampler for supplying said analog pulses from a continuous analog signal so that another analog pulse may be encoded when a prior operation is terminated.

19. Apparatus as in claim 16 wherein the output of the last stage of said counter is also connected to reset said voltage comparators under clause (a) and also reset said flip-flops.

20. Apparatus as in claim 16 wherein an enabling input of said comparator recited in clause (f) is connected, through an OR gate, to the alternate outputs of said counter.

References Cited by the Examiner

UNITED STATES PATENTS 3,021,517 2/1962 Kaenel ------------- 340—347

MALCOLM A. MORRISON, *Primary Examiner.*